May 7, 1946.　　　　P. A. NOXON　　　　2,399,885
COMPASS SYSTEM
Filed Dec. 17, 1940　　　　4 Sheets-Sheet 1

INVENTOR
Paul A. Noxon.
BY David F. Doody.
ATTORNEY

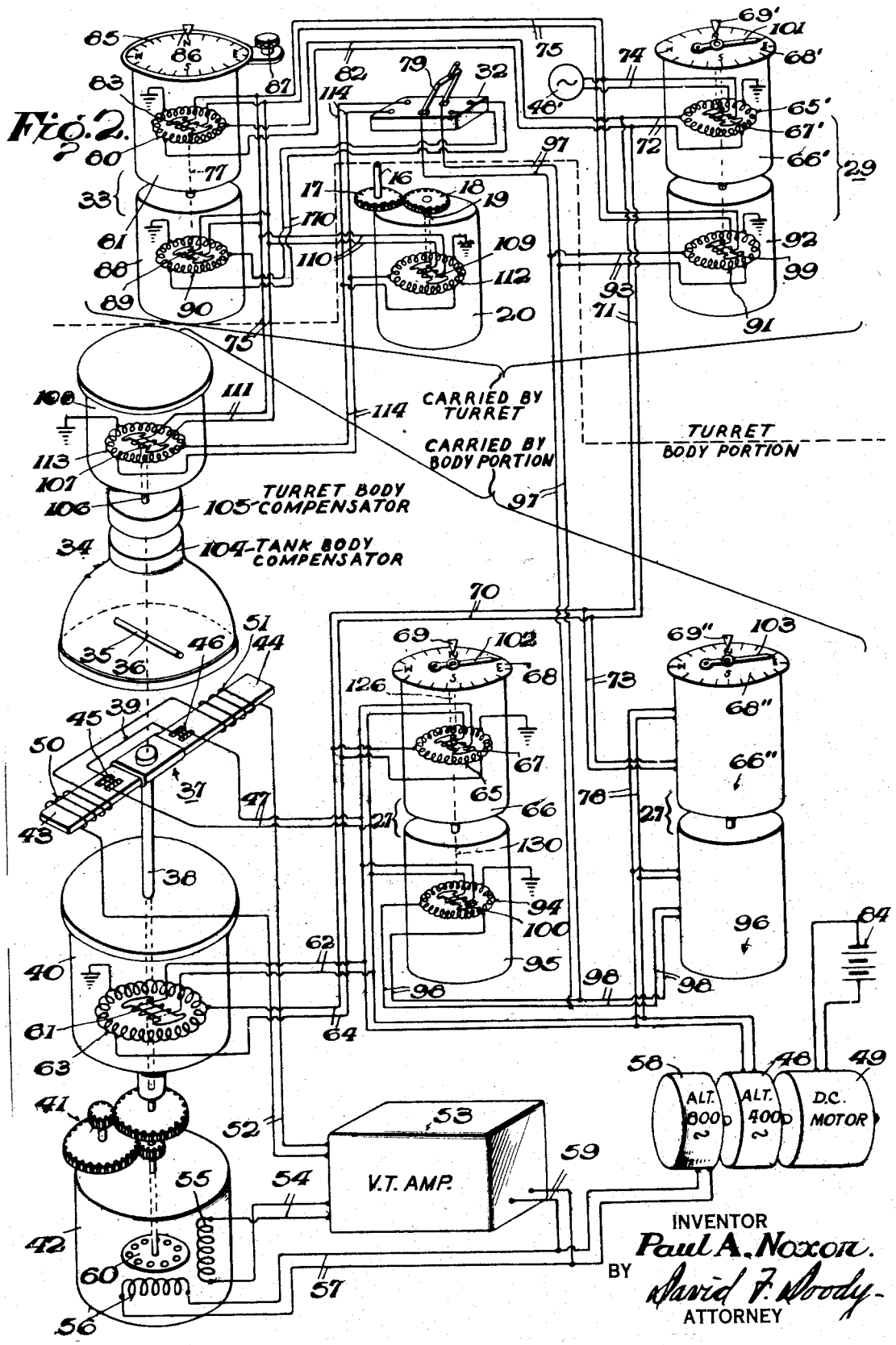

May 7, 1946.　　　　　P. A. NOXON　　　　　2,399,885
COMPASS SYSTEM
Filed Dec. 17, 1940　　　　4 Sheets-Sheet 3
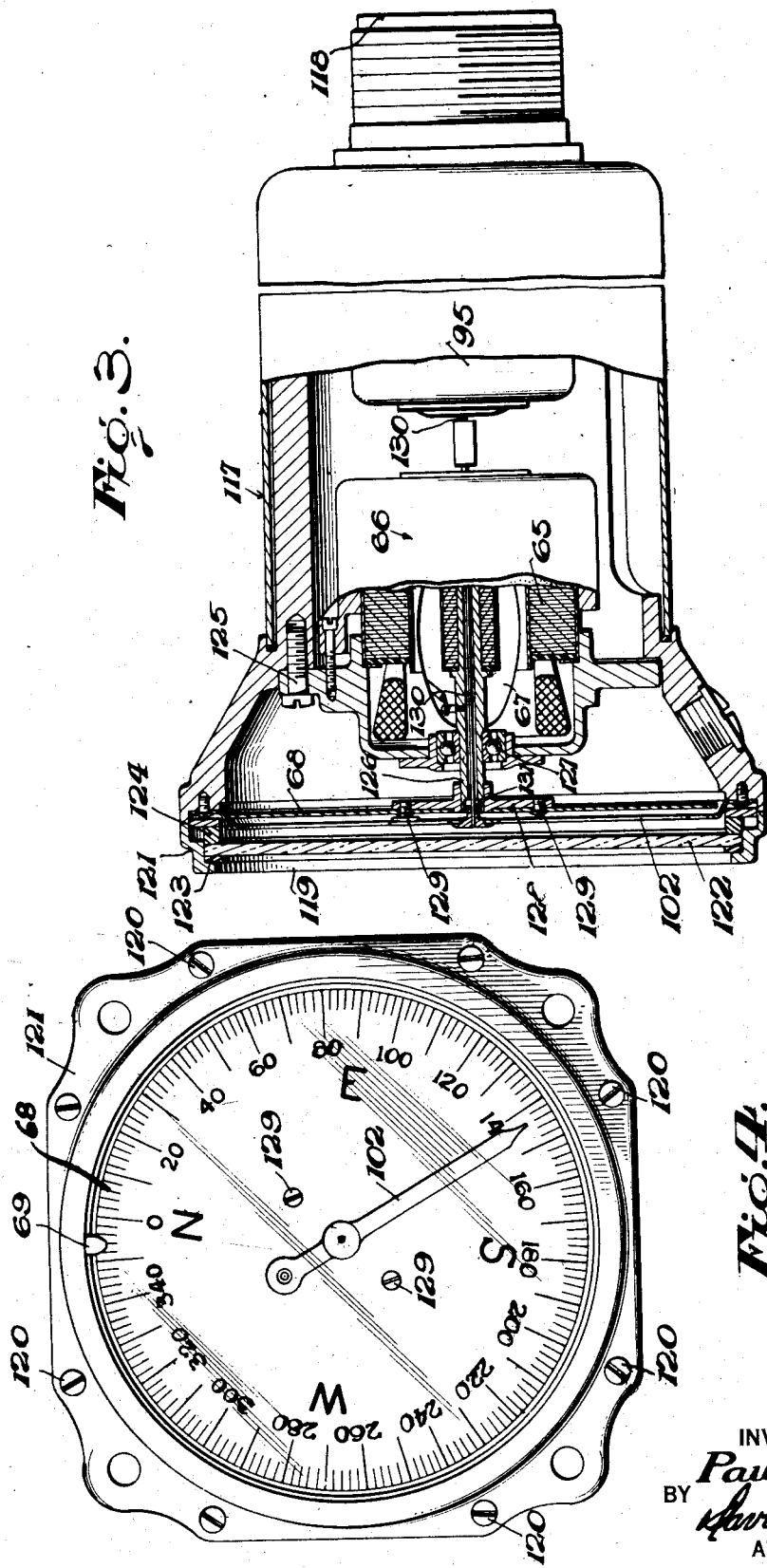
INVENTOR
Paul A. Noxon.
BY David F. Woody
ATTORNEY

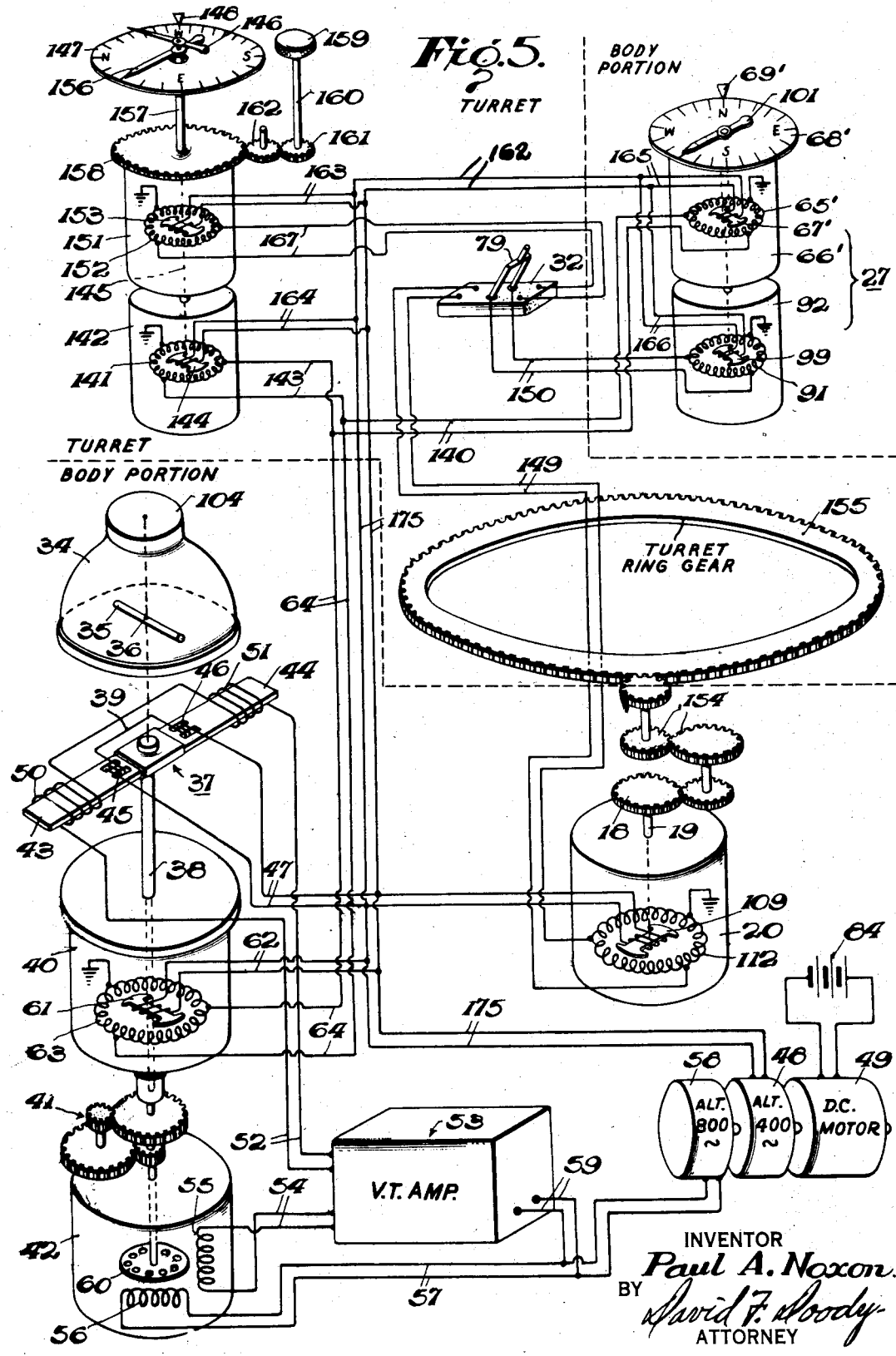

Patented May 7, 1946

2,399,885

UNITED STATES PATENT OFFICE 2,399,885

COMPASS SYSTEM

Paul A. Noxon, Tenafly, N. J., assignor to Bendix Aviation Corporation, South Bend, Ind., a corporation of Delaware Application December 17, 1940, Serial No. 370,537

5 Claims. (Cl. 33—225)

This invention relates to magnetic compasses and more particularly to compasses for dirigible craft having a turret member adapted for rotation with respect to the main body portion of the craft.

Heretofore, magnetic compasses for craft, such as fighting tanks, have been unsatisfactory, principally because of the insensitivity of the conventional magnetic compass in the iron and steel body of a tank, and also because of the difficulty of reading the card of the conventional compass during excessive vibration and the conditions of rough usage to which the tanks are subjected. Due to these and other deficiencies, no means, prior to the present invention, were available by which the angle of train of the gun turret, as well as bearing of the tank, could be readily ascertained.

It is an object of the present invention to provide a magnetic compass which will overcome these objections.

It is another object of the present invention to provide a novel type of magnetic compass and repeating system by which the bearing of a craft, such as a dirigible tank, and the angle of train of its turret, may be continuously and remotely indicated.

A further object of the invention lies in the provision of a novel repeating and indicating system for a magnetic compass by which a compass course may be manually selected, and which allows ready comparison of the bearing of the carrying vehicle and the angle of train of its gun turret.

These and other objects of the present invention will become readily understood upon a study of the following specification when made in conjunction with the attached drawings, throughout which like parts are designated by like reference characters.

Fig. 2 is a diagram, partly schematic and partly in perspective, of the compass and indicating system of the present invention;

Fig. 3 is an elevational view, partly in section, of an indicator used in the present invention;

Fig. 4 is a plan view of the indicator shown in Fig. 3; and

Fig. 5 is a diagram, partly schematic and partly in perspective, of another embodiment of the compass system of the present invention.

Figure 1:
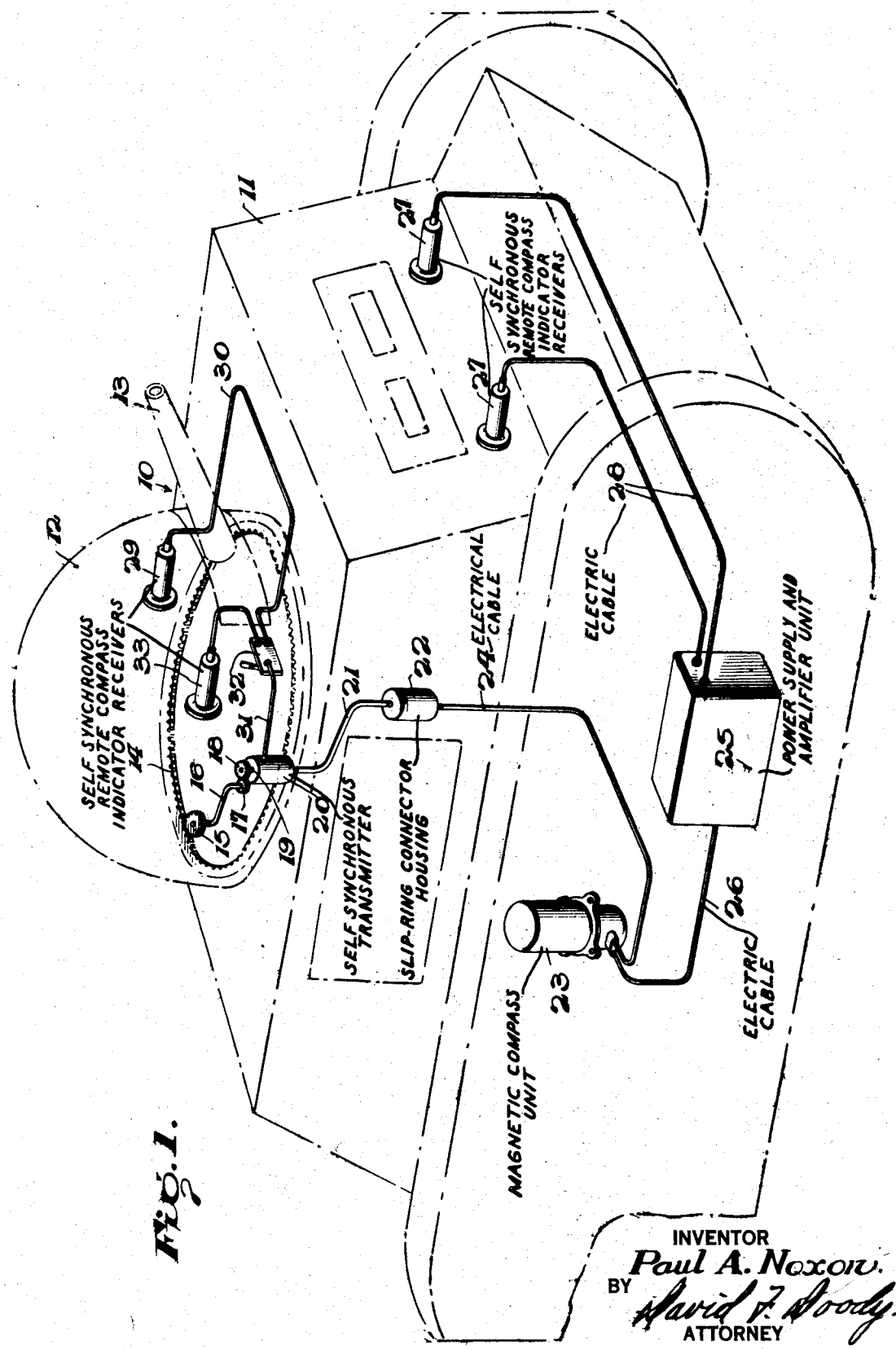
Fig. 1 is a perspective view of an installation of the compass system of the present invention, showing a tank in phantom.

Generally speaking, in accordance with the present invention, there is provided a magnetic compass carried by a craft, such as a tank, and an indicating and repeating system which will continuously show, not only the magnetic bearing of the carrying vehicle, but also the angle through which the gun turret has been revolved with respect to the longitudinal or some other selected axis of the vehicle.

Having particular reference to Fig. 1, there is shown at 10 a dirigible tank having a main body portion 11, and a turret 12, in which may be mounted one or more guns 13. Turret 12 is mounted so as to be rotatable with respect to body portion 11 under the control of a gunner, whose station is within turret 12, preferably centrally thereof. Turret 12 carries an annular gear member 14, and body portion 11 carries suitable driving means, not shown, whereby the gunner may rotate turret 12. A gear 15 is in mesh with gear member 14, and is mounted so as to rotate about a fixed axis upon rotation of turret 12 and gear 14. A flexible shaft 16 is connected, at its upper end, to gear 15, and at its lower end to pinion 17 in mesh with a gear 18 mounted on rotor shaft 19 of a self-synchronous transmitting means or electrical transmitting device 20. Rotor shaft 19 is connected at its lower end to a flexible shaft 21, which passes into slip-ring housing 22. Slip-ring connections are taken off within housing 22 and led to magnetic compass housing 23 by means of electrical cable 24. Housing 23 contains certain magnetic compass units which are shown in detail in Fig. 2, and to which reference will be made later. A power supply and amplifier unit 25 is provided, and input and output connections to compass housing 23 are carried by an electric cable 26. Remote compass indicators 27 are connected to unit 25 through electrical cables 28.

An additional remote indicator 29 is connected in circuit with housing 23 and unit 25 by means of electrical cable 30, which is connected through cable 31 and electrical conductors carried by flexible shafting 21, through slip-rings within housing 22 and cables 24 and 26. A switch 32 is provided for connecting a course-setting device 33, or course-indicating device 29, into and out of the compass circuit at the will of the gunner. Since Fig. 1 represents the mechanical installation, rather than an electrical schematic showing, the different conductors are grouped within the housing of shafting 21, and electrical cables 24, 26, 28, 30 and 31, more with a view to mechanical, rather than electrical simplicity, but Fig. 2 clearly sets forth the electrical circuits of the compass installations shown in Fig. 1.

Compass bowl 34 (within housing 23) contains a magnet 35, which may be pivoted at point 36 and floated in any suitable liquid, such as kerosene. A suitable magnet, pivot and float arrangement is shown in the patent to Weber, et al., 2,008,481, but since the present showing of a compass is mainly schematic, no pivot or float is illustrated, and only one magnet (35) is shown. The scale shown in the Weber patent is unnecessary in the use of the present invention, as no readings are to be taken directly from bowl 34, which may be opaque, and of metal such as brass or aluminum or of non-metallic material such as Bakelite, etc. Immediately beneath compass bowl 34 there is disposed a magnetic pick-up 37, which is mounted upon shaft 38. Shaft 38 extends through a transmitting motor 40 and is driven through suitable reduction gearing 41 by a two-phase induction motor 42. Magnetic pick-up device 37 comprises two leg members 43 and 44 of any permeable material, such as "Permalloy" or "Mumetal" and these legs carry exciting coils 45 and 46, which are connected in series by means of conductor 39, and through leads 47 to the output of alternator 48. Magnetic pick-up device legs 43 and 44 also carry windings 50 and 51 which are connected in series and through leads 52 to the input of vacuum tube amplifier 53, which may be of any well-known design. The output of amplifier 53 is connected through leads 54 to one phase winding 55 of two-phase induction motor 42. The other phase winding 56 is connected through leads 57 to the output of alternator 58.

Alternator 48 delivers energy at any particular frequency (for example, 400 cycles per second) and alternator 58 delivers energy at double the frequency (for example, 800 cycles per second) of alternator 48. Both alternators 48 and 58 are connected by rigid shafting to a D. C. constant-speed motor 49 of any conventional design, which may be energized by a battery 84. Energy for the vacuum tube circuits of amplifier 53 is supplied through leads 59 connected to the output of alternator 58. As more fully explained in the application, Serial No. 340,396, filed June 13, 1940, whenever a compass bowl, such as 34, is turned with respect to magnet 35, (that is, whenever the heading of the carrying craft is changed) the magnetic pick-up device 37 will cause phase winding 55 to become energized, rotating shaft 38 until magnetic pick-up device 37 assumes its normal null position with respect to compass magnet 35. It will be readily understood that since phase 55 is energized only when this null relation is disturbed, then self-rotation of motor 42 is not possible when magnet 35 and magnetic pick-up device 37 are in their predetermined null relation. Phase 56 is constantly energized by alternator 58, but, of course, rotor 60 of induction motor 42 cannot be rotated when only one phase is energized.

It is above stated that magnetic pick-up device 37 will be rotated to a null position, that is, with the longitudinal axis of magnet 35 at right angles to the axis of magnetic pick-up device 37, as defined by a straight line, including legs 43 and 44. The device 37 is termed a magnetic pick-up device since its function is to periodically shut out and admit lines of flux from an external field when it is placed within the field. It is obvious that in the null relation the magnetic lines of the field of magnet 35 are all at right angles to the longitudinal axis of magnetic pick-up device 37 and, therefore, no lines are induced to thread through legs 43 and 44, as the shortest path (that is, the path of lowest reluctance) from one pole to the other of magnet 35 will be across magnetic pick-up device 37, and not longitudinally thereof. When, however, the carrying craft turns, either leg 43 or 44, depending upon whether the craft makes a left or right turn, will be advanced, upsetting the right angle or null relation between the field of magnet 35 and magnetic pick-up device 37.

We may assume for the sake of explanation, that when magnetic pick-up device 37 is turned clockwise by the carrying craft, the direction of the lines of force through magnetic pick-up device 37 is such that leg 43 becomes an N pole, with respect to leg 44, which will then be an S pole. Therefore, when a current is set up in coils 50 and 51, due to the change of reluctance of magnetic pick-up device 37 by the periodic saturation and desaturation of the central portion thereof, by means of current from alternator 48 carried through coils 45 and 46, we will assume that the current, when amplified in amplifier 53, and led to phase winding 55, will be so related to the current in phase winding 56 as to cause rotation of rotor 60 and shaft 38 in a counter-clockwise position, until the null relation is again established, at which point none of the field of magnet 35 threads magnetic pick-up device 37 and, therefore, no current is induced in windings 50 and 51. Now, if the craft turns to the right, leg 44 will be advanced in a counter-clockwise direction and it now becomes an N pole and leg 43 now becomes an S pole so that the current in coils 51 and 50 is in the opposite direction (since it is fundamental that the direction of the current in a coil reverses upon reversal of the direction of the magnetic field cutting the coil) and the current in phase winding 55 is in the opposite direction, and rotor 60, along with shaft 38, will rotate in a clockwise direction to restore the null relation. Due to the fact that a voltage is set up in coils 50 and 51, not only upon saturation but also upon desaturation of the central portion of magnetic pick-up device 37, and since for every half cycle of current from alternator 48, there will be one complete cycle of saturation and desaturation, the frequency of the current in coils 50 and 51, and therefore in phase winding 55, will be double the frequency of alternator 48, and for this reason it is necessary that phase winding 56 be energized at double the frequency of alternator 48, and of course as stated above, alternator 58, having twice the frequency of alternator 48, is provided for excitation of phase winding 56.

It should be understood that alternator 48 and exciting coils 45, 46 do not establish a magnetic field that will cut coils 50 and 51, but will saturate and desaturate the central portion of magnetic pick-up device 37 so that the reluctance to the field of magnet 35 is alternately high and low, causing a change in the number of flux lines cutting coils 50 and 51 due to the presence of flux from the external field.

In rotating magnetic pick-up device 37 to a null position, induction motor 42 turns shaft 38 which also carries rotor 61 of transmitter 40. Upon rotation of rotor 61, which is energized by alternator 48 through leads 62, currents will be set up in stator 63 which will be conducted through ground and leads 64 to the stator 65 of receiver 66 and induce in rotor 67 currents which will cause rotor 67 to move azimuth indicating scale 68 by an angular amount equal to the angular rotation of shaft 38. It is believed that further explanation of the self-synchronous system is unnecessary in view of its well-known use in the repeater art. In order that bearings may be read from scale 68, there is provided an index or fiducial mark 69, which is fixed with respect to the carrying vehicle in the manner of a lubber line.

Other remote indications of bearings or rotation of shaft 38 may be had by means of self-synchronous receivers 66' and 66'' which are connected in parallel with self-synchronous receiver 66. Since the stator connections between self-synchronous receiver 66 and self-synchronous receivers 66' and 66'' are identical electrically, it is believed necessary only to explain the electrical connections between the stator 65 of self-synchronous receiver 66, and the stator 65' of self-synchronous receiver 66'. Leads 70 from self-synchronous receiver stator 65 are connected to conductors 71 which are connected to stator 65' by means of leads 72. Rotor member 67' is connected to scale 68', and index 69' affords a reference for the reading of bearings from scale 68'. A like indication is had also by means of scale 68'', and index reference 69''. Stator member, not shown, of self-synchronous receiver 66'' is connected in parallel to the stator of self-synchronous receiver 66' by means of conductors 73. Rotor 67' is connected through leads 74 to alternator 48' and rotor 83 of self-synchronous receiver 81 is connected through conductors 75 to the output of alternator 48'. These rotors are to be connected to alternator 48 in actual practice, but alternator 48' is here shown so that long leads may be avoided in the diagram. The rotor, not shown, of self-synchronous receiver 66'' is also energized by alternator 48 through conductors 78. Self-synchronous receivers 66 and 66'' may be considered as parts of remote indicators 21 shown in Fig. 1, while self-synchronous receiver 66' may be considered as part of remote indicator 29 as shown in Fig. 1.

Stator 80 of receiver 81 is electrically connected to stator 63 through leads 64, 70, 71 and 82, therefore rotation of rotor 61 causes like angular movement of rotor 83. No indicator is connected directly to rotor 83; however through a shaft 77, rotor 83 is connected to a rotor 89 of a self-synchronous transmitter 88, and thus, whenever the carrying craft changes its heading, rotor 83 will move through the same angle as the craft and will cause rotor 89 to be turned with respect to stator member 90 by the same angular amount. Stator member 90 is connected through leads 170 to the right-hand contacts of switch 32. Additional self-synchronous receivers 92, 95 and 96 (associated with self-synchronous transmitting motors 66', 66 and 66'', respectively) have their stator members connected in parallel through leads 93, 98 and 97 to switch blades 79 of switch 32. The rotor members of self-synchronous transmitting devices 95 and 96 are connected in parallel to the output alternator 48 along with the rotor of self-synchronous means 92 which, for convenience, is shown as connected to alternator 48' rather than to alternator 48. No rotor or stator for self-synchronous means 96 is shown, but it will be understood that the rotor is connected in parallel to the rotors 99 and 100, while the stator member is connected in parallel with the stators 91 and 94 of self-synchronous means 92 and 95, respectively.

Transmitting means 20 has its stator 112 connected to the left-hand contacts of switch 32, through conductors 114, which also connect the stator 113 of synchronous receiving means 108 in parallel with stator 112. Rotors 107 and 109 are connected in parallel to the alternator 48' through leads 110, 111 and 75.

With switch blades 79 closed in the left-hand position, electrical transmitting means 20 will be connected so as to control indications of pointers 101, 102 and 103, giving indications of turret train as these pointers are rotated by movements of rotors 99, 100 and the rotor of transmitter 96, respectively. Since bearings of the carrying vehicle are indicated by the numerical value of azimuth scale 68 (as well as 68' and 68'') under index 69, and since pointer 102 (as well as pointers 101 and 103) indicates the angle by which the zero or reference point (such as gun 13) varies from the heading of the carrying vehicle in train, a dual indication of heading and turret train is readily observable.

In the event the gunner or commander of the tank might wish to signal a new course to be steered by the pilot, switch blades 79 are closed to the right-hand contacts of switch 32, and then, transmitting synchronous means 20 is removed from the circuit and transmitting synchronous means 88 is substituted therefor through conductors 170. Now the new course is selected by rotating dial 85 by means of knob 87. Since dial 85 is fixed to the housing of synchronous means receiver 81, rotation thereof will result in both stator 80 and rotor 83 being carried through the angle by which dial 85 is turned. Since this operation does not relatively displace rotor 83 and stator 80, no change is introduced to the compass indicating system controlled by transmitting means 40, but since the stator 90 of self-synchronous transmitting means 88 is not rotated with dial 85, there will result relative rotation between stator 90 and rotor 89 since this rotor is fixed to turn with rotor 83 by means of shaft 77. As a result, therefore, the angle by which scale 68 is moved with respect to index 86 is indicated by pointers 101, 102 and 103. He then steers until pointers 69 and 102, for example, are in alignment. If desired an auxiliary signal or alarm system of any conventional type may be utilized to warn the pilot that he is now to steer the course indicated by pointer 102 or 103 (either of which might be at his station). As the pilot changes the heading of the tank, to assume the new course, indicated by pointer 102, for example, the index 69 will approach pointer 102 and when 69 arrives under pointer 102, the tank will then be headed on the new course selected.

It will be apparent that the gunner, by adjustment of knob 87, may select any course that is desired, and the pilot may steer this course by manipulation of the vehicle in accordance with the indications of pointer 102. Remote indications of bearing and course may be provided at any desired station, and having reference to Fig. 1, it will be seen that three crew members are given simultaneous information as to course and bearing. These are: the gunner, who obtains the indications from instrument 29; the pilot, who follows the indications of one of the indicators 27; and another member of the crew, such as an auxiliary gunner, who observes indications upon the other of indicator instruments 27.

It will be appreciated that due to the influence of iron and steel in the body portion 11 of tank 10, the earth's magnetic field will be distorted, and therefore compensation for deviation of the type usually employed on a ship's compass is to be applied to the compass needle 35. For this purpose, there is provided a compensating chamber 104, mounted upon bowl 34, in which there may be arranged a series of magnets having axially manually adjustable magnetic screens or sleeves mounted thereon to form a compensating system such as that disclosed in the patent to Urfer, No. 1,933,194. Substantially permanent compensation for magnetic deviation may be carried out by swinging the body 11 through 360 degrees and making indicated magnetic bearings (at selected points throughout 360 degrees) agree with known magnetic headings in the manner commonly followed for the compensation of marine vessels. After compensation of tank body 11, the readings of scales 68, 68' and 68" will be thereby corrected for magnetic deviation caused by body portion 11.

It has been found that the proximity of iron in the gun 13 and turret 12 to compass magnet 35, causes additional distortion of the earth's field in the vicinity of the compass, which may change as the angle of train is changed, and thus the indicated bearing of body portion 11 may change while turret 12 is rotated, even though body portion 11 is stationary. In order to correct for the erroneous indication due to rotation of an uncompensated turret 12, an additional magnetic compensator, which is rotated upon movement of turret 12, will react upon needle 35 to introduce the proper correction to overcome the magnetic influence of turret rotation upon the readings of scales 68, etc.

This additional compensator is manually adjustable and comprises a chamber 105 mounted upon a shaft 106 connected to rotor member 107 of self-synchronous receiver 108. A pair of magnets carrying manually adjustable magnetic screens or sleeves, one magnet and sleeve mounted so as to counteract the north-south component of undesired magnetic influences and the other so mounted as to counteract the east-west component of undesired magnetic influences, as shown in the Urfer Patent 1,933,194, may be contained in chamber 105. With body portion 11 on a fixed heading, for example north, turret 12 is swung through 360 degrees, and the magnetic screens are manually adjusted and set, as taught by the Urfer patent, so that compenastion for any deviation caused by the turret body 12 in the indicated bearing on scale 68 may thus be removed.

The mechanical combination of self-synchronous means 66 and 95, by which a composite indication of azimuth and train is obtained by use of fiducial mark 69, indicator scale 68 and pointer 102, is shown more fully in Figs. 3 and 4.

Indicator housing 117 contains self-synchronous electrical receivers 66 and 95, which are aligned axially therein. The electrical connections to the receivers are made through a plug receptacle 118 of conventional form. Housing 117 has an enlarged open end 119 to which is connected, by any suitable means, such as screw studs 120, a conventional instrument facing ring member 121, having a glass window 122 secured therein by pressure between gaskets 123 and 124, and with index 69 rigidly attached to the upper portion of housing 117 and extending into the range of window 122. Self-synchronous electrical means 66 and 95 are mechanically secured within housing 117 by any suitable means, such as studs 125. Rotor member 67 is mounted upon a hollow shaft 126 which is journalled in suitable bearings 127. Shaft 126 is connected to azimuth scale 68 by means of hub member 128 which is welded to, or screwed upon, shaft 126 and attached to azimuth scale 68 by means of screw members 129. Rotation of shaft 126 will, therefore, cause rotation of azimuth scale 68, and bearings in azimuth will be indicated by the numerical value of scale 68 under index 69. Shaft 130, which is connected to rotor member 100 (see Fig. 2) of self-synchronous electrical means 95, extends through hollow shaft 126 and is connected at its outer end to pointer member 102. Therefore, rotation of rotor 100 will cause rotation of pointer 102. Shaft 130 is supported for rotation within hollow shaft 126 by means of a suitable bearing member 131.

The electrical circuit for another embodiment of the invention is shown in Fig. 5. The magnetic compass elements including bowl 34, magnetic pick-up device 37, induction motor 42, etc., are arranged and operate in exactly the same manner as has been described above for the system shown in Fig. 2; and like reference characters have been used to denote those elements of this embodiment of the system which are common to the system shown in Fig. 2.

Whenever shaft 38 is rotated due to the change of heading of the carrying vehicle, scale 68' will be rotated to indicate the new bearing under index 69', as stators 63 and 65' are connected in parallel through leads 64 and 140. As above pointed out, 67' controls scale 68' and thus, the remote indication of bearing may be had. Stator 141 of a receiver 142 is also connected in parallel to stator 63 through leads 64 and 143, thus, rotation of shaft 38 will cause a like angular rotation of rotor 144, which is connected to a shaft 145 driving a pointer 146. An azimuth scale 147, fixed with respect to the carrying vehicle and having an index or lubber mark 148, is provided so that an indication of bearing may be had in cooperation with pointer 146. When blades 79 of switch 32 are thrown to the left, stator 91 is placed in circuit with stator 112 of electrical transmitter 20 through leads 149 and 150. Rotor 109 of electrical transmitter 20 is rotated by gear 18 which is in mesh with a train 154 which is driven upon rotation of turret 12, (not shown) carrying ring gear 155. As synchronous electrical transmitting motor means 20 is responsive to angular movement of turret 12, then upon rotation of turret 12, rotor 99 drives pointer 101 so that the angle of train of the turret may be read from scale 68' at the pilot's station.

When switch blades 79 are closed to the right, then synchronous electrical transmitting means 20 is out of the electrical circuit and movements of turret 12 are not transmitted to pointer 101; however, a synchronous electrical transmitting means 151 having a stator 152, a rotor 153, and a pointer 156 is substituted for self-synchronous transmitting means 20. The housing of transmitter 151 carries a spur gear 158 upon which is mounted a hollow shaft 157 carrying a pointer 156. Shaft 145, which carries pointer 146, passes through hollow shaft 157 in a manner similar to the shafting arrangement shown in detail in Fig. 3, except that rotors 153 and 144 are both fixed to shaft 145. A hand knob 159 carried by a shaft 160 to which is attached a gear 161 is provided for rotation of gear 158 through a suitable pinion 162. The gunner or commander of the tank may manipulate knob 159 to cause pointer 156 to assume any desired point on scale 147. Rotor 153 is energized by alternator 48 through conductors 175 and 163, and rotor 99 of synchronous electrical transmitting means 92 is likewise energized by alternator 48 through conductors 162 and 166, while stators 152 and 91 are connected in parallel through ground and through conductors 167 and 150, so that any motion of stator 152 (caused by rotation of gear 158) relative to rotor 153, will cause rotation of rotor 99 and, therefore, pointer 101 and the point indicated by the position of 156 on scale 147 will be repeated by pointer 101 on scale 68'. The pilot of the tank, who may be notified by an auxiliary signal system, such as one involving colored lights, that the gunner has closed switch 32 to the right, may steer the new course as indicated to him by pointer 101 changing the heading of the tank until index 69' is rotated by changing the course of the vehicle to agree with pointer 101.

So far as the pilot is concerned, the indicating system in Fig. 5 is exactly the same as the indicating system in Fig. 2, since pointer 101 (and such additional pointers such as 102 and 103 as may be provided) will indicate turret train when blades 79 of switch 32 are closed to the left and a newly set course when switch blades 79 are closed to the right. However, the gunner or commander obtains his bearing and train indications by means of one scale, 147, and pointers 148 and 156. Also, he sets any selected course by revolving pointer 156 with respect to scale 147, and indications thereof, with switch blades closed to the right, are transmitted to the pilot by means of pointer 101.

While the present invention has been described as applicable to dirigible tanks, it is apparent that it may be employed in any vehicle, such as an aircraft or battleship, wherein it is of advantage to know the magnetic bearing of the vehicle, and also the magnetic bearing or angle of train of a rotatable turret carried by the vehicle. Further, any number of remote stations may be provided so that bearings may be repeated to any station desired. The present invention has been fully shown and described as employing magnetic needle 35 as the directive element, but the invention is equally well adapted to use as a magnetic compass of the earth inductor type, and in the event that it is so used, flux gate 37 will be made to respond to the directive influence of the earth's field, and no magnetic needle will be employed. If the invention is used in the form of an earth inductor compass, obviously bowl 34 and needle 35 will be omitted, but compensation for deviation of the earth's field due to swing of turret 12 may still be effected through the use of compensating chamber 105.

While an alternating current transmitting and repeating system has been shown for repeating compass and turret bearings in indicators 27, 29 and 33 it is to be understood that any conventional direct current repeating system may be substituted therefor.

The amplifier 53 may be a vacuum tube amplifier of any conventional design and is therefore not shown in detail. One skilled in the art will understand this without further explanation.

Although only two embodiments of the present invention have been described, it will be understood that many changes may be made without exceeding the scope of the present invention, which should be measured, not by the particular examples set forth, but by the appended claims.

What is claimed is:

1. A bearing and train indicator for a vehicle in which said bearing indicator includes a magnetic compass needle, said vehicle including a body portion and a trainable turret capable of distorting the magnetic field in the region of said compass needle deviation compensating means associated with said needle, means controlled by said compass needle indicating the bearing of said vehicle with respect to said magnetic needle, and said train indicator including a transmitter, a receiver in circuit therewith, an indicator carried by said receiver, and turret rotation responsive means for controlling said transmitter and receiver and for rotating said deviation compensating means to compensate for the distortion of the field in the region of said compass needle for various train angles of said turret.

2. In combination with a vehicle having a body portion and a trainable turret portion carried by said body portion rotatable about an axis of said body portion, a magnetic compass having a compass needle carried by said body portion, said turret portion upon rotation distorting the magnetic field in the region of said compass needle, magnetic deviation compensating means carried by said body portion adjacent said compass and mounted for rotation with said turret portion to prevent deviation of said compass needle, means controlled by said compass for indicating the magnetic bearing of said body portion, index means affixed to said body portion adapted to rotate around said compass controlled means for indicating magnetic bearing upon changing the bearing of said body portion, means coacting with said magnetic bearing indicating means for indicating the angle of train of said turret portion, and means controlled by rotation of said turret portion in circuit with and adapted to rotate said deviation compensating means synchronously with the rotation of said turret portion to thereby simultaneously indicate direction of turret train and compensate for said distortion of the magnetic field in the region of said compass needle during rotation of said turret portion on the body portion.

3. In combination with a vehicle having a body portion, and a turret portion rotatable about an axis of said body portion, a magnetic compass carried by said body portion; said compass including a magnetic needle, a magnetic pick up device within the influence of the magnetic field of said needle, an induction motor, an electrical transmitting device having a rotor and a stator carried by said body portion, shaft means adapted to rotate said magnetic pick up device, the rotor of said electrical transmitting device and said induction motor in unison, electrical connections between said magnetic pick up device and said induction motor, said shaft means being rotated by said motor in accordance with changes of bearing of said magnetic pick up device with respect to said magnetic needle, rotatable means carried by said body portion adjacent said compass for compensating for magnetic deviation of said magnetic needle, a second electrical transmitting device having a rotor and a stator carried by said turret portion, an electrical receiving device having a rotor and a stator carried by the said body portion, electrical connections between the respective rotors and stators of said second electrical transmitting device and said electrical receiving device, an indicator carried by the rotor of said receiving device adapted to indicate the angle of turret train, a second electrical receiving device having a stator and a rotor in circuit with the respective stator and rotor of said first-mentioned electrical transmitting device, an indicator carried by the rotor of the second of said electrical receiving devices adapted to indicate the heading of the vehicle positioned in the same focal plane with said first-mentioned indicator, means responsive to rotation of said turret portion with respect to said body portion for rotating the rotor of said second electrical transmitting device, and means controlled by said second transmitting device for synchronously rotating said deviation compensating means when the turret portion is rotated, whereby upon rotation of said turret portion with respect to said body portion, the indicator carried by the first of said electrical receiving devices will indicate the angle of train of said turret portion, while compensating for deviation of the compass due to turret rotation and the indicator carried by the second of said electrical receiving devices will simultaneously indicate the bearing of said body portion in azimuth in a common focal plane.

4. In combination with a vehicle having a body portion and a turret portion carried by said body portion rotatable about an axis of said body portion, a magnetic compass carried by said body portion, said turret portion upon rotation being capable of distorting the magnetic field in the region of said compass needle, magnetic deviation compensating means, means for moving said compensating means including an electrical receiver having a rotor and a stator carried by said body portion adjacent said compass, said compensating means being moved to prevent deviation of the compass when said turret portion is rotated, flux valve means responsive to changes in azimuth of said vehicle, a polyphase motor having one phase thereof in circuit with said flux valve means and the other phase connected to a source of power supply, transmitting means including a rotor and a stator, a drive connection between the rotor of said motor and the rotor of said transmitting means, receiving means electrically connected to said transmitting means including a rotor and a stator, a compass card connected to and rotatable by said receiving means rotor, an index member affixed to said body portion adjacent said compass card, turret angle receiving means mounted in alignment with said compass card including a rotor and a stator, a pointer connected to and rotatable by said turret angle receiving rotor, transmitting means controlled by rotation of said turret including a rotor and stator, said transmitting means controlling said turret angle receiving means and said means for moving said compensating means stator, so as to energize and rotate the rotors of said deviation compensating means receiver and said turret train receiving means synchronously to compensate for the distortion of the field in the region of said compass needle while rotating said turret portion to indicate angle of train with respect to the said compass card by rotation of said pointer.

5. A bearing indicator for a vehicle in which the bearing indicator includes a magnetic compass needle, means controlled by said compass needle indicating the bearing of said vehicle with respect to said magnetic needle, said vehicle including a body portion and a trainable support rotatably mounted on said body portion capable of distorting the magnetic field in the region of said compass needle, means connected to said support and responsive to rotation thereof relative to said body portion, means operated by and proportionally to said rotation of said support connected means, and deviation compensating means associated with said compass needle and connected to be controlled by said means responsive to said support connected means for rotating said compensating means to compensate for the distortion of the field in the region of said compass needle for various train angles of said support.

PAUL A. NOXON.